Patented Oct. 10, 1950

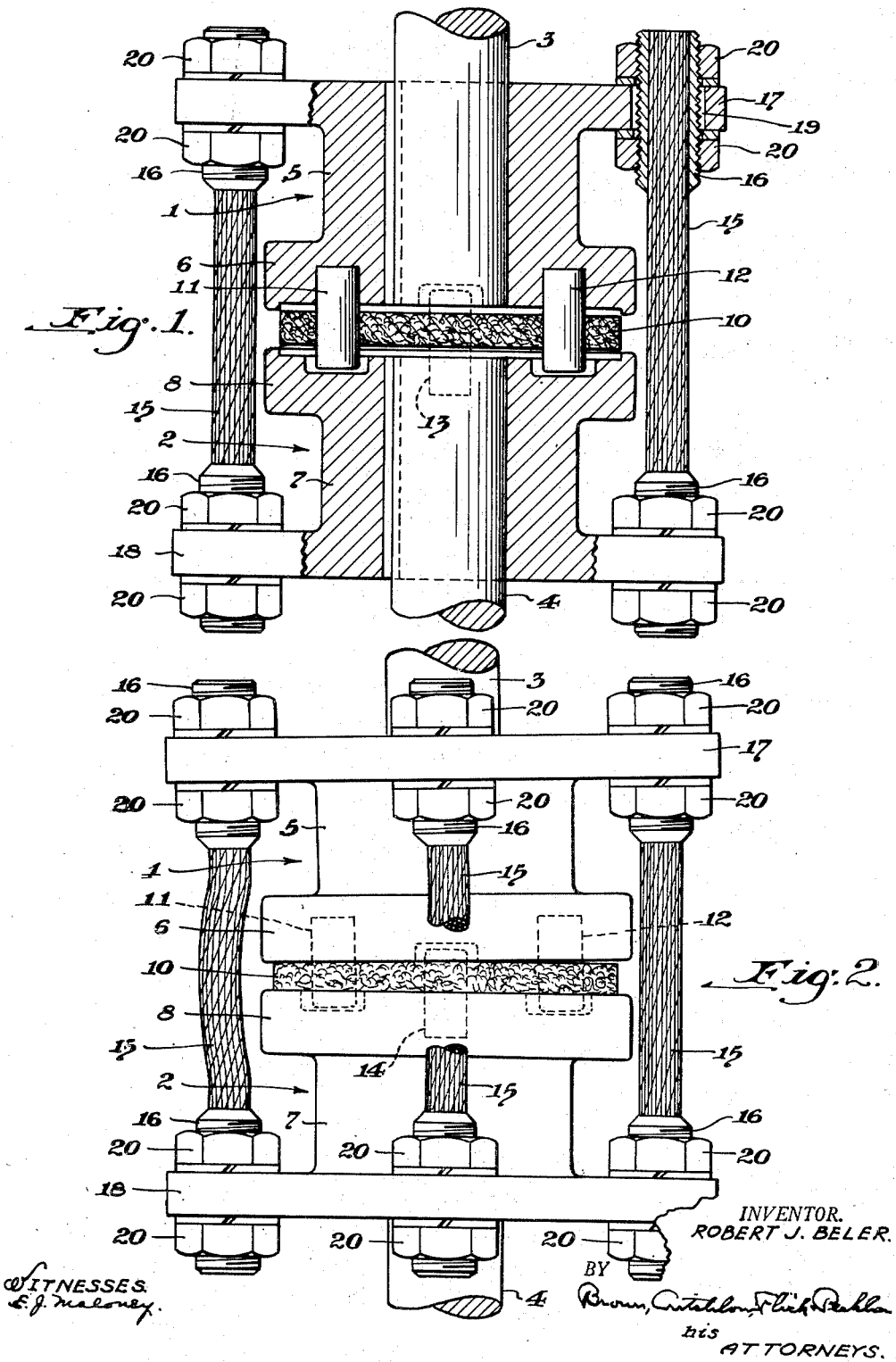

2,525,580

UNITED STATES PATENT OFFICE 2,525,580

FLEXIBLE COUPLING

Robert J. Beier, Pittsburgh, Pa.

Application August 22, 1946, Serial No. 692,238

3 Claims. (Cl. 64—13)

This invention relates to flexible couplings which are used in various environments, as for example, between driving and driven sections of a shaft to prevent breakage of an otherwise continuous integral shaft when it is subjected to forces tending to bend it.

Flexible couplings of the type here contemplated are provided with interengaging elements which effectively transmit torque from the driving to the driven members when they are in axial misalignment as well as when in axial alignment, but which are incapable of adequately resisting tension forces that act axially of the drive to separate the driven from the driving members. For example, such tension forces arise in a suspended vertical shaft whose lower end is equipped with liquid-stirring or agitating blades or similar instrumentalities, and they arise in a horizontal marine propeller shaft when it is driven in the reverse of its normal direction to cause a ship to move backwardly. Flexible couplings of the type here contemplated cannot be used in shafts that are thus subject to tension forces because the resulting longitudinal movements of the driven section of the shafts separate the coupling members.

The object of this invention is to provide a flexible coupling of the type stated with simple and effective means, separate from the torque-transmitting means of the coupling, for adequately resisting only those forces that tend to separate the driven from the driving member of the coupling in a direction axially of the drive, whereby the coupling may be used in a shaft that is subjected to tension forces that tend to separate the interengaging members of the coupling.

The invention is illustrated in the accompanying drawings, of which Fig. 1 is a vertical central sectional view of a flexible coupling embodying the invention, the coupling being shown as connecting a driving to a driven section of a suspended drive shaft, the sections of the shaft being in axial alignment; and Fig. 2 an elevation of the coupling shown in Fig. 1 when the sections of the shaft are in axial misalignment.

The flexible coupling provided according to this invention comprises driving and driven members adapted to be attached to the adjacent ends of driving and driven sections of a shaft, and means for transmitting only torque from the driving to the driven members when the sections of the shaft are axially aligned as well as when they are in axial misalignment. Such torque-transmitting means may be any of those now commonly used in such couplings, such as metal or fiber disks, loosely engaging teeth, or various forms of flexible members. Separate from and independent of such torque-transmitting means, the driving and driven members are, either directly or through instrumentalities that are attached to the adjacent ends of shaft sections, connected to each other by flexible means that are formed to resist only tension forces that tend to separate the members from each other in a direction axially of the drive. These flexible members, which are preferably in the form of metallic cables, are so constructed and so attached to the members of the coupling that under all conditions of service the torque-transmitting element or elements of the coupling effectively transmit torque from the driving to the driven coupling member regardless of tension forces encountered by the coupling that tend to separate the coupling members axially of the drive, and, accordingly, to impair the torque-transmitting means or to disconnect the coupling members.

In the illustrative embodiment of the invention, the coupling is shown as comprising a driving member 1 and a driven member 2 which are connected to the adjacent ends of a driving section 3 and a driven section 4, respectively, of a vertical drive shaft. The driving member has a hub 5 that is keyed or otherwise connected to shaft section 3, and is provided at its lower end with a laterally-extending disc-shaped flange 6. Similarly, driven member 2 has a hub 7 that is connected to shaft section 4, and a flange 8 that faces flange 6.

Between the adjacent faces of flanges 6 and 8, there is a torque-transmitting ring or disc 10 which may be formed of any suitable material, such as fiber composition or laminated resilient metal. The lower face of flange 6 is shown as being provided with two downwardly extending pins 11 and 12 which lie in openings formed in disc 10, these pins being positioned at diametrically opposite sides of the longitudinal axis of the drive. Similarly, the upper face of flange 8 is provided with upwardly extending pins 13 and 14 that engage openings in disc 10, pins 13 and 14 being spaced 90° from pins 11 and 12 around the axis of the drive. As is well known in this art, the driving and driven members may each be provided with more than two disc-engaging pins spaced at substantially equal angular intervals and alternating at substantially equal angular intervals. When shaft section 3 is driven, torque is transmitted from it through hub 5, flange 6, and pins 11 and 12 to disc 10, and from that disc through pins 13 and 14, flange 8 and hub 7 to shaft section 4.

The driving and driven members of the coupling are shown as being connected to each other by four flexible metallic cables 15 angularly spaced 90° from each other around the axis of the drive, although a different number of such cables may be provided. To each end of each cable there is firmly attached a sleeve 16 which is exteriorly threaded. The upper end of driving coupling member 1 is provided with an outstanding flange 17, and the lower end of driven member 2 is similarly provided with an outstanding flange 18, each of which flanges is provided with openings 19 through which cable sleeves 16 extend. Each sleeve is engaged by nuts 20, one of which is on one side and the other on the other side of flange 17 or 18, which nuts may be adjusted to vary the effective lengths of the cables.

When shaft sections 3 and 4 are in axial alignment, as shown in Fig. 1, all of cables 15 are taut and all of them then resist tension forces acting between driving member 1 and driven member 2 tending to separate them. By suitably turning and tightening nuts 20, the effective lengths of the cables are so adjusted that torque is effectively transmitted through the coupling when the shaft sections are in axial alignment, as well as when they are axially misaligned. When the shaft sections are in axial misalignment, as shown in Fig. 2, one or more of cables 15 flexes in the general manner shown at the left of that figure, while the other cables remain taut to resist axial forces from the coupling. As the shaft rotates, each of the connecting cables successively flexes and becomes taut in the manner indicated.

According to the provisions of the patent statutes, I have explained the principle and operation of my invention and have illustrated and described what I now consider to be the best embodiment of it. However, I desire to have it understood that, within the scope of the appended claims, the invention may be practiced otherwise than as specifically illustrated and described.

I claim:

1. A flexible coupling comprising driving and driven members, means between and engaged by said members for transmitting only torque from one to the other thereof, and a plurality of flexible metallic cables spaced at substantially equal angular intervals around and outside the coupling and rigidly connected at one of their ends to said driving and at the other of their ends to said driven members, said cables being rigid lengthwise thereof and being capable of resisting only tensile forces that act to separate said members axially of the coupling.

2. A flexible coupling comprising driving and driven members, means between and engaged by said members for transmitting only torque from one to the other thereof, each of said members being provided with a flange that extends laterally beyond said torque-transmitting means, and a plurality of flexible metallic cables spaced at substantially equal angular intervals around the coupling and outside of said torque-transmitting means, one end of each of said cables being rigidly connected to one of said flanges, and the other end of each of said cables being connected to the other of said flanges for adjusting the length of the cables between the flanges, said cables being rigid lengthwise thereof and being capable of resisting only tensile forces that act to separate said members axially of the coupling.

3. A flexible coupling comprising a driving member, a driven member, each of said members being provided with a laterally extending flange, a disc between the adjacent ends of said members formed to transmit only torque from one to the other thereof, said driving and driven members being provided at substantially equal angular intervals around the coupling with pins that engage said disc, a plurality of flexible metallic cables spaced at substantially equal angular intervals around the coupling, means for rigidly connecting the ends of said cables to said flanges on said driving and said driven members and for adjusting the length of the cables between said flanges thereof, said cables being rigid lengthwise thereof and being capable of resisting only tensile forces that act to separate said members axially of the coupling.

ROBERT J. BELER.

REFERENCES CITED

The following references are of record in the file of this patent:

UNITED STATES PATENTS

| Number | Name | Date |
|---|---|---|
| 527,632 | Verity | Oct. 16, 1894 |
| 1,795,165 | Daniel | Mar. 3, 1931 |
| 2,423,568 | Slowig | July 8, 1947 |